US 7,345,665 B2

(12) United States Patent
Chang

(10) Patent No.: US 7,345,665 B2
(45) Date of Patent: *Mar. 18, 2008

(54) METHOD AND APPARATUS FOR STEREOSCOPIC DISPLAY EMPLOYING A TRANSMISSIVE ACTIVE-MATRIX LIQUID CRYSTAL PIXEL ARRAY

(76) Inventor: Sin-Min Chang, 5 Mohegan Rd., Shelton, CT (US) 06484

( * ) Notice: Subject to any disclaimer, the term of this patent is extended or adjusted under 35 U.S.C. 154(b) by 214 days.

This patent is subject to a terminal disclaimer.

(21) Appl. No.: 11/199,889

(22) Filed: Aug. 9, 2005

(65) Prior Publication Data

US 2007/0035494 A1    Feb. 15, 2007

(51) Int. Cl.
*G09G 3/36*    (2006.01)
(52) U.S. Cl. .................. 345/87; 345/204; 345/212; 345/213; 345/214
(58) Field of Classification Search .......... 345/87–104, 345/204–215
See application file for complete search history.

(56) References Cited

U.S. PATENT DOCUMENTS

| | | | |
|---|---|---|---|
| 4,717,949 | A | 1/1988 | Eichenlaub |
| 4,829,365 | A | 5/1989 | Eichenlaub |
| 5,036,385 | A | 7/1991 | Eichenlaub |
| 5,675,351 | A | 10/1997 | Kaneko et al. |
| 5,760,827 | A | 6/1998 | Faris |
| 6,016,159 | A | 1/2000 | Faris |
| 6,243,064 | B1 | 6/2001 | Hirakata |
| 6,252,707 | B1 | 6/2001 | Kleinberger et al. |
| 6,437,839 | B1 | 8/2002 | Cacharelis |
| 6,456,266 | B1 | 9/2002 | Iba et al. |
| 6,756,954 | B2 | 6/2004 | Yamamoto et al. |
| 2003/0112507 | A1 | 6/2003 | Divelbiss et al. |
| 2003/0234909 | A1 | 12/2003 | Collender et al. |
| 2004/0227706 | A1 | 11/2004 | Sung |

FOREIGN PATENT DOCUMENTS

WO    WO 2004/001486    12/2003

OTHER PUBLICATIONS

Kooi F.L, "The Case for Transparent Depth Displays" Report TNO-TM 2001-A067/E, Soesterbert, The Netherlands.

(Continued)

*Primary Examiner*—Vijay Shankar
(74) *Attorney, Agent, or Firm*—Gordon & Jacobson, PC

(57) ABSTRACT

An improved stereoscopic display apparatus and methodology includes an array of liquid-crystal-based transmissive pixels are cleared (i.e., placed in a "dark" state) before being loaded with the desired analog voltage potential signal for display during both left perspective image display periods and right perspective image display periods. In this manner, cross-frame image interference between the left and right perspective images is avoided and the quality of the stereoscopic viewing experience is improved. In another aspect, an improved stereoscopic display apparatus and methodology includes an array of liquid-crystal-based transmissive pixels. During right perspective image display periods, the pixels of the array are loaded with analog voltage potential signals corresponding to a left perspective image while displaying the preceding right perspective image. Likewise, during left perspective image display periods, the pixels of the array are loaded with analog voltage potential signals corresponding to a right perspective image while displaying the preceding left perspective image. In this manner, cross-frame image interference is avoided and the left and right perspective image display periods can be expanded.

12 Claims, 7 Drawing Sheets

OTHER PUBLICATIONS

3D Gaming World, "3D Glasses—How They Work", www.3dgw.com/Articles/articlepage.php3?id=1, printed May 12, 2005.

Web Publishers:, "Dan's Data Letters #43" www.dansdata.com/dansletters043.htm, Oct. 23, 2004.

Brick Bradford, "StereoGraphics Products and Modern Displays", www.stereographics.com/support/lcd-paper.htm, 2000.

3D Display Technology, "How do 3D Displays Work?" www.sharp3d.com/technology/how3ddisplayworks, printed May 12, 2005.

3D Display Technology, "Sharp 3D 'Glasses Free' Display Technology" www.sharp3d.com/technology/howsharp3dworks, printed May 12, 2005.

Andrew J. Woods, "Compatibility of Display Products with Stereoscopic Display Methods" Centre for Marine Science & Technology, Curtin University of Technology, Australia.

Peter Rojas, Engadget, "ViewSonic's 4-ms response time VX924 and VX724 LCDs" Mar. 16, 2005, www.engadget.com/entry/1234000087036297.

Vincent Alzieu, Technical Aspects LCDs: Overdrive, Contrast and Viewing Angles:—BeHardware, Mar. 30, 2005, www.behardware.com/art/imprimer/561/.

White Paper, Ultra-Fast LCD Panels Breaking the 8ms Barrier, Feb. 1, 2005.

LCtec Displays, Twisted Nematic Liquid Crystal Display 3(3), c Stephen Palmer 2005, www.ltecdisplays.com/TN-LCD_technology_side_3.asp.

|  | Right Perspective Image Display Periods | | Left Perspective Image Display Periods | |
|---|---|---|---|---|
|  | Load $C_s$ / Hold $C_s$ | Drive Pixel with voltage stored on $C^*_s$ | Load $C^*_s$ / Hold $C^*_s$ | Drive Pixel with voltage stored on $C_s$ |
| T1 | ON/OFF |  |  | OFF |
| T2 | OFF/OFF |  |  | ON |
| T3 |  | ON | OFF/OFF |  |
| T4 |  | OFF | ON/OFF |  |

FIG. 5(D)(ii)

METHOD AND APPARATUS FOR STEREOSCOPIC DISPLAY EMPLOYING A TRANSMISSIVE ACTIVE-MATRIX LIQUID CRYSTAL PIXEL ARRAY

BACKGROUND OF THE INVENTION

1. Field of the Invention

This invention relates to stereoscopic display methodologies and systems. More particularly, this invention relates to page flipping stereoscopic display methodologies and systems as well as apparatus used therein.

2. State of the Art

Stereoscopic display systems display two perspective images in such a way that each eye of the observer sees only one of the two images. There are many systems in existence that provide this capability through various methods. One of these methods in commonly referred to as "page flipping" or frame-sequential stereo video. In such methods, left and right perspective images are time-division multiplexed and thus displayed during different display periods (i.e., left and right perspective image display periods). Stereoscopic glasses (e.g., shutter-type or polarization-type glasses) are used to ensure that the left perspective images are presented to the left eye during the left perspective image display periods and that the right perspective images are presented to the right eye during the right perspective image display periods.

Autostereoscopic systems have been developed that utilize optics (e.g., lenticular systems, parallax barrier, mirror systems, etc.) to present the left perspective images to the left eye and the right perspective images to the right eye without the need for glasses. Such systems are costly and suffer from various technical problems such as limited depth of field, low brightness, and constrained view regions (i.e., the observer(s) are required to be located in limited viewing area(s) relative to the display).

Page flipping stereoscopic display systems are typically realized with a cathode ray tube (CRT) display that is adapted to operate in a progressive scan mode that alternately displays a left perspective image and a right perspective image. Such systems provide adequate performance but are limited by their screen size and weight. With this in mind, users have attempted to employ the prior art page flipping stereoscopic display methodologies to active-matrix liquid-crystal display (LCD) panels. Such panels advantageously provide for increased screen size and significant reductions in weight. However, when used for page flipping stereoscopic viewing, the line-based update mechanisms employed by LCD panels cause significant cross-frame image interference where the pixels from a left perspective image are displayed concurrently with pixels from a right perspective image as shown in FIG. 1. Such interference degrades the image quality and limits commercial acceptability of LCD-based stereoscopic display systems.

SUMMARY OF THE INVENTION

It is therefore an object of the invention to provide an improved page-flipping LCD-based stereoscopic display apparatus and methodology that reduces cross-frame image interference.

It is another object of the invention to provide such a stereoscopic display system and methodology that provides improved image quality and stereoscopic viewing.

In accord with these objects, which will be discussed in detail below, an improved stereoscopic display apparatus and methodology includes an array of liquid-crystal-based transmissive pixels that are cleared (i.e., placed in a "dark" state) before being loaded with the desired analog voltage potential signal for display during both left perspective image display periods and right perspective image display periods. In this manner, cross-frame image interference between the left and right perspective images is avoided and the quality of the stereoscopic viewing experience is improved.

In the first embodiment, the display apparatus is adapted to clear all pixels of the array before being loaded with the desired analog voltage potential signal for display during both left perspective image display periods and right perspective image display periods. Such clearing is accomplished by simultaneous activation of all gate lines of the array while supplying voltage potential signals that produce "dark" pixels to all source lines of the array.

In the second embodiment, the array includes a reset line for each row of pixels. Each pixel includes a discharge transistor that when activated provides a conduction path that discharges the storage capacitor of the pixel. The reset line for a given row of pixels is electrically coupled to the control electrode of the discharge transistor for each pixel of the given row. The pixels are cleared before being loaded with the desired analog voltage potential signal for display during both left perspective image display periods and right perspective image display periods. Such clearing is accomplished by activating the reset lines for all rows of the array. The activation of the reset lines activates the conduction paths provided by the discharge transistors for all the pixels of the array.

In another aspect, an improved stereoscopic display apparatus and methodology includes an array of liquid-crystal-based transmissive pixels. During right perspective image display periods, the pixels of the array are loaded with analog voltage potential signals corresponding to a left perspective image while displaying the preceding right perspective image. Likewise, during left perspective image display periods, the pixels of the array are loaded with analog voltage potential signals corresponding to a right perspective image while displaying the preceding left perspective image. In this manner, cross-frame image interference is avoided and the left and right perspective image display periods can be expanded.

Additional objects and advantages of the invention will become apparent to those skilled in the art upon reference to the detailed description taken in conjunction with the provided figures.

DETAILED DESCRIPTION

Figure 2:
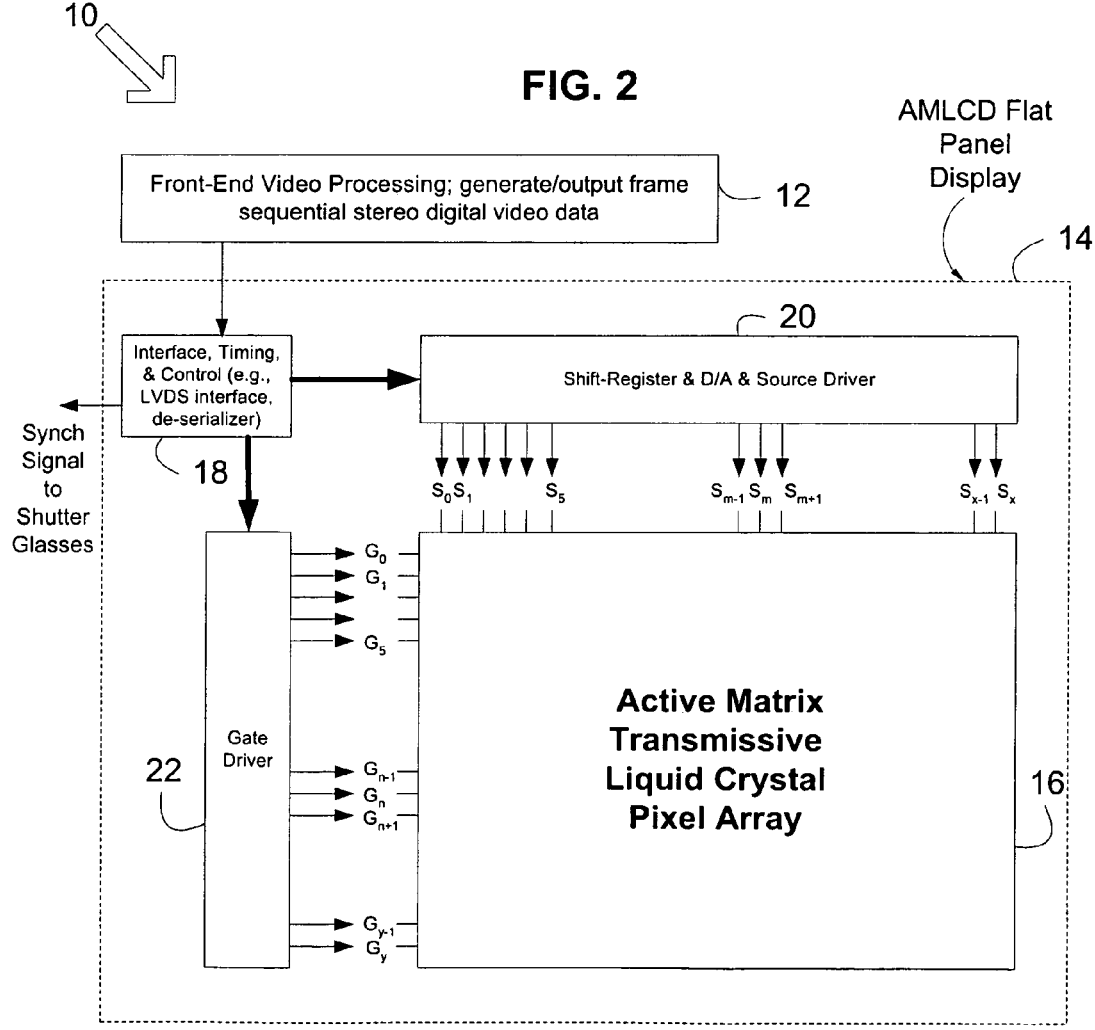
FIG. 2 is a functional block diagram of an exemplary transmissive active-matrix liquid crystal display apparatus in which the present invention can be embodied.

Turning now to FIG. 2, there is shown a functional block diagram of a stereoscopic transmissive active-matrix LCD flat panel display system 10 in which the present invention can be embodied, including a front-end video processor 12 that interfaces to an active-matrix LCD flat panel display 14. The video processor 12 generates and outputs a frame sequential stereo video signal that represents a sequence of image pairs that include left and right perspective images (or frames) that are to be displayed on a transmissive-type active-matrix liquid crystal pixel array 16. A backlight and rear polarizer (not shown) injects polarized light from the rear into the transmissive pixels of the array 16. A front polarizer (not shown) is disposed between the transmissive pixels of the array 16 and the observer.

In the preferred embodiment, the left and right frames of the frame sequential digital video signal are formatted in accordance with the 24-bit RGBHVC (red, green, blue, horizontal sync, vertical sync, pixel clock) digital format. Other digital video formats can be used. The front-end video processor 12 can be realized as part of the graphics engine of a personal computer, a set-top box that receives cable-based or satellite-based television signals, a video player (such as a DVD player), a dedicated 3D gaming machine, or other suitable audio/video component.

The display 14 includes an interface block 18 that receives the frame sequential digital video signal communicated from the video processor 12. In the preferred embodiment, the frame sequential digital video signal is communicated from the video processor 12 to the interface block 18 over a serial communication channel that employs low-voltage differential signaling (LVDS). In this configuration, the interface block 18 includes LVDS interface circuitry and a de-serializer. The interface block 18 recovers the red, green and blue pixel data encoded in the frame sequential digital video signal, possibly re-scales such pixel data, and forwards the red, green and blue pixel data to a column driver 20 as is well known. It also includes a timing signal generator and control circuit that generates a pixel clock as well as other timing control signals that are supplied to the column driver 20 and a gate driver 22 as is well known.

The gate driver 22 and the column driver 20 cooperate to load the active pixels of the array 16 with the appropriate analog voltage levels (which correspond to the red, green and blue pixel data supplied to the column driver 20) and hold such voltage levels for a predetermined time period (which corresponds to the duration of the active frame). To perform this function, the column driver 20 preferably includes shift registers and digital-to-analog converters that generate analog voltage levels which correspond to the red, green and blue pixel data supplied thereto as well as source drivers that supply such analog voltage levels to the respective source lines $S_0, S_1, \ldots S_x$ of the pixel array 16. The polarity of the analog voltage levels preferably conform to an inversion scheme (e.g., pixel dot inversion, sub-pixel dot inversion) in order to prevent polarization of the liquid crystal material and reduce flicker. The gate driver 22 includes addressing logic and drivers that selectively activate and deactivate the gate lines $G_0, G_1, \ldots G_y$ of the pixel array 16. When the gate driver 22 activates a gate line (for example, gate line $G_0$) for a given row of the array 16, the voltage levels supplied by the column driver 20 on the source lines $S_0, S_1, \ldots S_x$ of the array 16 are loaded into the pixels of the given row (e.g., the row corresponding to gate line $G_0$).

Figure 3A:
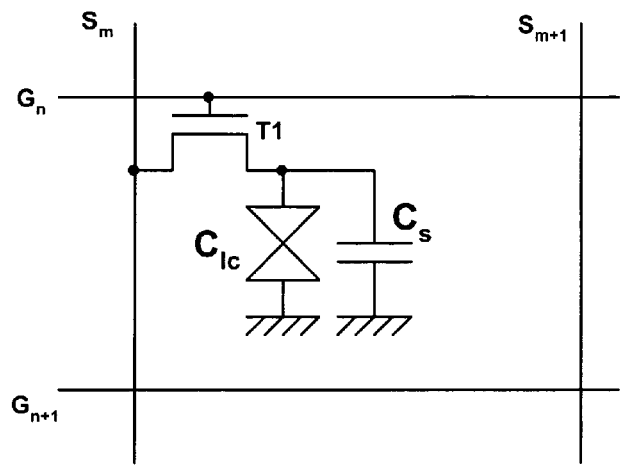
FIG. 3(A) is a schematic diagram of an exemplary active pixel structure for the pixels of the array of FIG. 2.

A schematic diagram of an exemplary active pixel structure is shown in FIG. 3(A). In this structure, the pixel has a storage capacitor $C_s$, a source line $S_m$ (which is coupled to the pixels of the column m of the array), and a gate line $G_n$ (which is coupled to the pixels of the row n of the array). The source line $S_m$ for the pixel is selectively coupled to both the first plate of a storage capacitor $C_S$ and the transparent bottom electrode of the liquid crystal cell (denoted by its parasitic capacitance $C_{lc}$) by the current path of a thin-film transistor T1. The second plate of the storage capacitor $C_s$ is coupled to ground potential. The transparent top electrode of the liquid crystal cell is coupled to a reference voltage (e.g., ground potential as shown). The gate line $G_n$ for the pixel is coupled to the control electrode (gate) of the transistor T1. Color filter materials (not shown) are integrated into the pixel structure to selectively pass a desired color band of light (e.g., red light for red pixels, blue light for blue pixels, and green light for green pixels). The voltage potential stored on the storage capacitor $C_s$ provides a voltage difference between the bottom and top pixel electrodes, which controls the orientation of the LC material therebetween. Such control over the orientation of the LC material of the cell provides control over the polarization state of the light emitted therefrom and is used as part of a light valve to control the gray level light intensity for the pixel. The active pixel elements and the bottom electrodes of the pixels are integrated on a transparent glass substrate. The top electrodes of the pixels are integrated on an opposing transparent glass substrate. Liquid crystal material is disposed between these two substrates to realize the transmissive liquid crystal cells of the array 16.

During a loading operation, the gate driver 22 activates the gate line $G_n$, which causes the current path of transistor T1 to be activated. The column driver 20 presents the desired voltage potential signal onto the source line $S_m$, where it is loaded into the storage capacitor $C_s$ by the activated current path of transistor T1. The gate driver then de-activates the gate line $G_n$, which causes the current path of transistor T1 to be de-activated and thus isolates the storage capacitor $C_s$ and the liquid crystal cell from the source line $S_m$. During this time period (which is referred to as the hold period), the charge stored by storage capacitor maintains the application of the desired voltage potential signal on the liquid crystal cell. This holding condition continues for the duration of the active frame. These loading and holding operations are performed for each row of the pixel array 16. After the duration of the current frame has expired, these loading and holding operations are performed over the rows of the pixel array 16 for the next frame.

Figure 1:
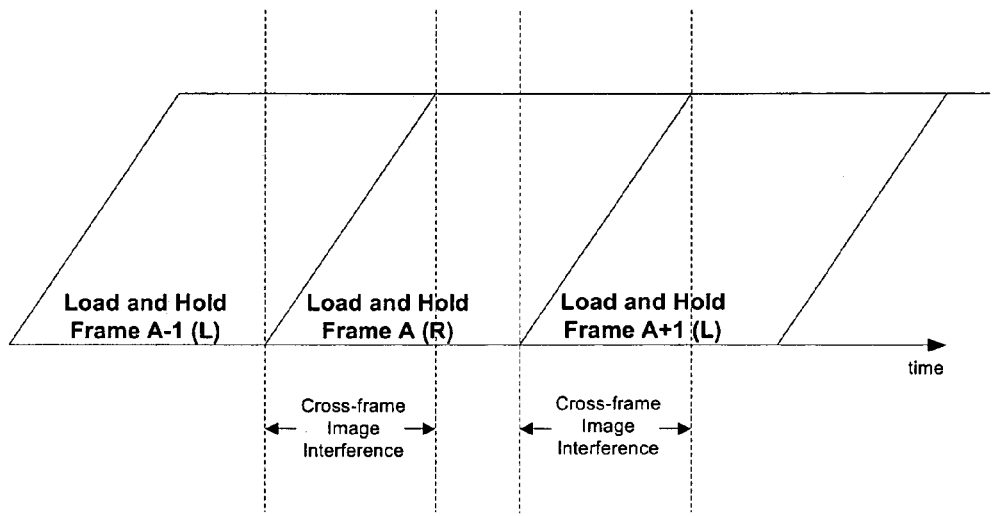
FIG. 1 is a schematic diagram illustrating the load and hold operations of a prior art active-matrix liquid crystal display apparatus in displaying a frame-sequential stereo video signal.

In accordance with the present invention, the column driver 20 and the gate driver 22 of the display 14 are adapted such that the pixels of the array 16 are cleared (i.e., placed in a "dark" state) before the pixels are loaded with the desired analog voltage potential signal for display during both left perspective image display periods and right perspective image display periods. In this manner, cross-frame image interference between the left and right perspective images (FIG. 1) is avoided and the quality of the stereoscopic viewing experience is improved.

Figure 3B:
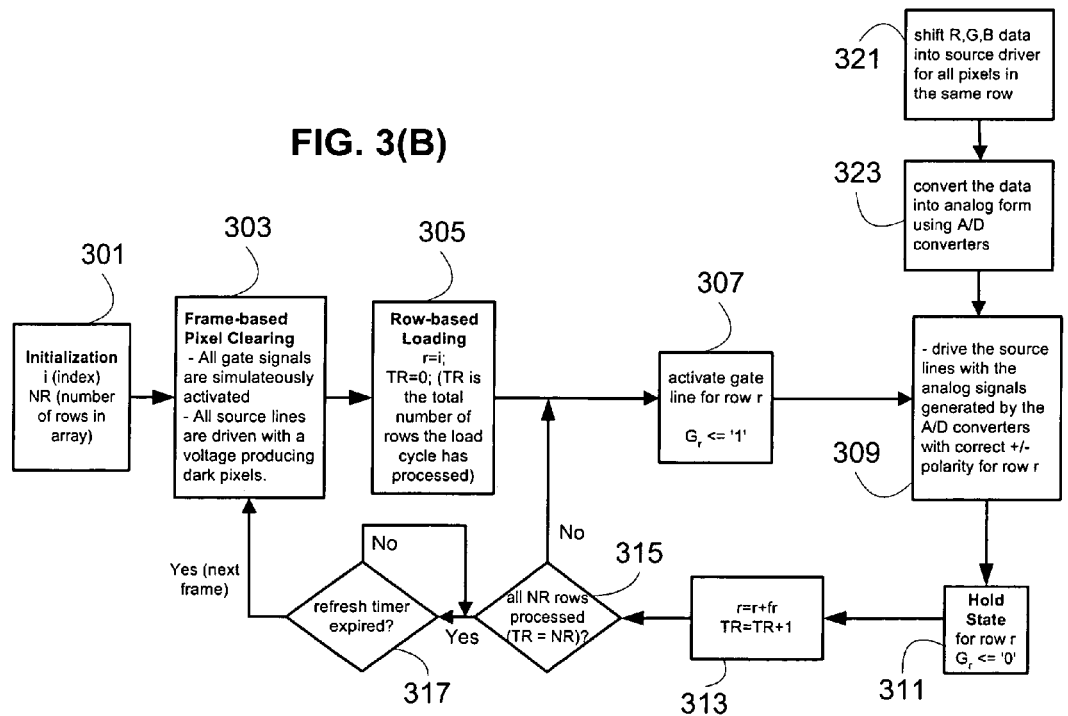
FIG. 3(B) is a flow chart illustrating the frame-based pixel clearing operations and row-based load and hold operations that are carried out by the column driver and gate driver of the display apparatus of FIG. 2 in accordance with a first embodiment of the present invention.
Figure 3C:
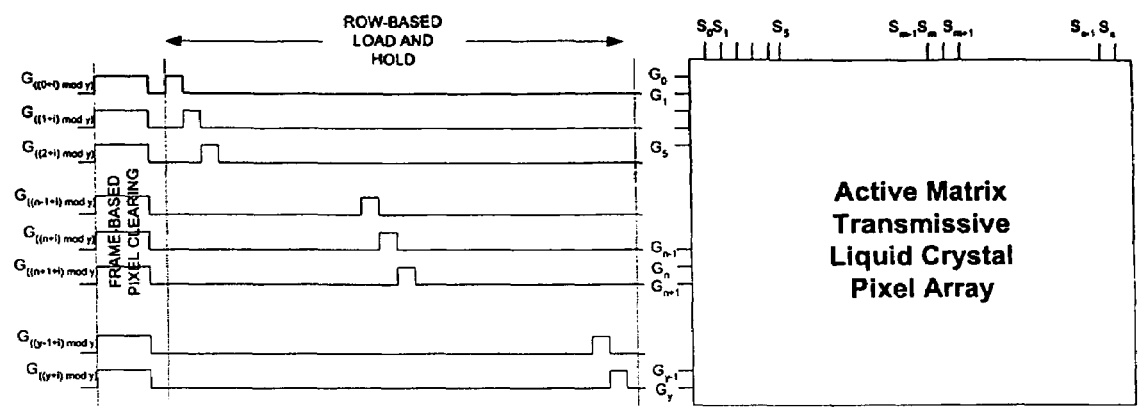
FIG. 3(C) is a schematic diagram that illustrates the operation of the gate driver of FIG. 2 in activating and de-activating the gate lines of the pixel array as part of the pixel clearing operations and the load and hold operations of FIG. 3(B).
Figure 3C:
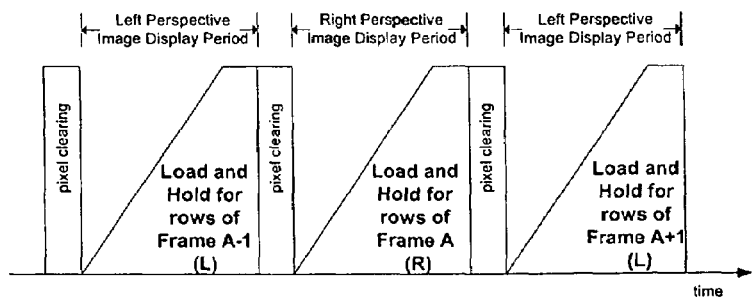
Figure 3D:
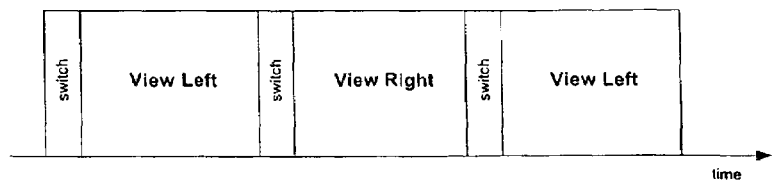
FIGS. 3(D)(i) and (ii) are schematic diagrams that illustrate the temporal relationship of the pixel clearing operations and load and hold operations of FIG. 3(B) with the operation of shutter glasses, respectively.

FIGS. 3(B), 3(C), 3(D)(i) and 3D(ii) illustrate a first embodiment of the present invention whereby the column driver 20 and the gate driver 22 are adapted to perform a frame-based pixel clearing operation. As depicted in the flow chart of FIG. 3(B), the operations begin in block 301 by initializing an index i (which refers to the starting row number in each frame) and a variable NR (which refers to the total number of rows in the array and in each frame). In block 303, a frame-based pixel clearing operations is performed wherein the gate driver 22 simultaneously activates all of the gate line $G_0, G_1, \ldots G_y$ of the array 16 ($G_0 <= '1'$, $G_1 <= '1', \ldots G_y <= '1'$) and the column driver 20 drives all of the source lines $S_0, S_1, \ldots S_X$ of the array 16 with a voltage potential that produces "dark" pixels. In blocks 305-315, row-based loading and holding operations are performed over the rows of the array 16 for the current frame. In block 305, a counter r (which refers to the current row) is set to the index i, and a counter TR (which refers to the total number of rows processed in the loop of blocks 305-315) is initialized to '0'. In block 307, the gate driver 22 activates the gate line $G_r$ for the row r ($G_r <= '1'$). In block 309, the column driver 20 drives the source lines So, $S_1, \ldots S_x$ of the array 16 with the analog voltage levels and polarities in accordance with the red, green and blue pixel data corresponding to the pixels of the row. Such data is shifted into the column driver 20 in block 321 and converted from digital to analog form in block 323. As a result of blocks 307 and 309, for each given pixel in the row r, the current path of the T1 transistor is activated for the given pixel and the desired voltage potential signal is loaded into the storage capacitor $C_s$ of the given pixel by the activated current path of the T1 transistor. In block 311, the gate driver 22 de-activates the gate line $G_r$ for the row r ($G_r <= '0'$), which causes the current path of the T1 transistor to be de-activated for each pixel in row r and thus isolates the storage capacitors and the liquid crystal cells of the pixels in row r from their corresponding source lines. In this condition, the charge stored by the respective storage capacitors maintains the application of the desired voltage potential signal on the corresponding liquid crystal cell. This holding condition continues for the duration of the active frame. In block 313, the current row counter r is updated by a function fr and the counter TR is incremented by 1. In the preferred embodiment, the initialization of the row counter rand the function fr are adapted to provide smooth and balanced illumination distributed over the rows of the panel 16. In block 315, it is determined if all of the rows of the array 16 have been processed (i.e., TR=NR). If not, the operation returns to blocks 307-313 to load and hold the next row of pixels. If so, the operations continue to block 317 to wait for a refresh timer to expire. Such expiration marks the end of the display period for the current frame. Upon expiration of the refresh timer, the operations return to blocks 303-315 to perform the frame-based pixel clearing operations and row-based load and hold operations for the pixels in the next frame. The load and hold operations for the pixels of each frame alternate between operations that display a left perspective image in a left perspective image display period and operations that display a right perspective image in a right perspective image display period (FIG. 3(D)(i)). During the left perspective image display period, the analog voltage potential signals loaded into the pixels of the array are derived from the red, green and blue pixel data of the corresponding left perspective image data that is received by the column driver 20. During the right perspective image display period, the analog voltage potential signals loaded into the pixels of the array are derived from the red, green and blue pixel data of the corresponding right perspective image data that is received by the column driver 20.

FIG. 3(C) illustrates the operation of the gate driver 22 in activating and de-activating the gate lines the array 16 as part of the frame-based pixel clearing operations and the row-based load and hold operations of FIG. 3(B).

FIGS. 3(D)(i) and (ii) illustrate the temporal relationship of the pixel clearing operations and load and hold operations of FIG. 3(B) with the operation of shutter glasses, respectively. Such operations provide for improved stereoscopic viewing. As shown in FIG. 3(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the frame-based pixel clearing operations of the display as shown, is synchronized to the corresponding left and right perspective image display periods of the display by a synchronization signal communicated from the interface block 18 to the shutter glasses (FIG. 2). The synchronization signal may be communicated from the interface block 18 to the shutter glasses over a wired or wireless communication link therebetween.

FIGS. 4(A), 4(B), 4(C), 4(D)(i) and 4D(ii) illustrate a second embodiment of the present invention whereby the active pixel structure, the column driver 20 and the gate driver 22 are adapted to perform pixel clearing operations utilizing reset lines that are each coupled to a row of pixels in the array 16. In this second embodiment, the gate driver 22 and the column driver 20 of the display 14 are adapted such that the pixels of the array 16 are cleared (i.e., placed in a "dark" state) before the pixels are loaded with the desired analog voltage potential signals. In this manner, cross-frame image interference (FIG. 1) is avoided.

Figure 4A:
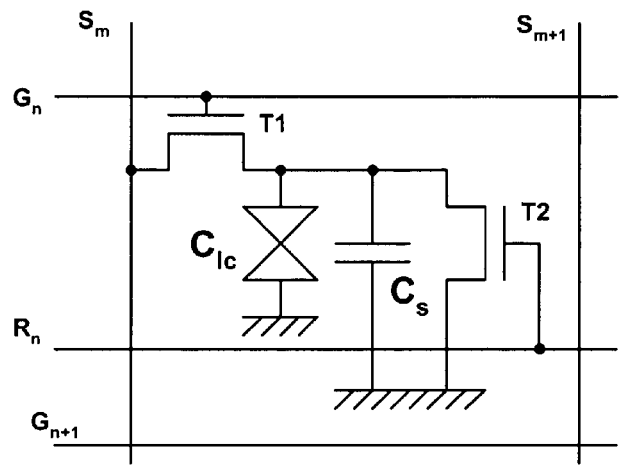
FIG. 4(A) is a schematic diagram of an alternate active pixel structure for the pixels of the array of FIG. 2.

FIG. 4(A) illustrates an alternate active pixel structure in accordance with the present invention. In this structure, the pixel has a storage capacitor $C_s$, a source line $S_m$ (which is coupled to the pixels of the column m of the array), and a gate line $G_n$ and reset line $R_n$ (which are coupled to the pixels of the row n of the array). The source line $S_m$ for the pixel is selectively coupled to both the first plate of a storage capacitor $C_s$ and the transparent bottom electrode of the liquid crystal cell (denoted by its parasitic capacitance $C_{lc}$) by the current path of a thin-film transistor T1. The transparent top electrode of the liquid crystal cell is coupled to a reference voltage (e.g., ground potential as shown). The second plate of the storage capacitor $C_s$ is also coupled to the reference voltage (e.g., ground potential as shown). The gate line $G_n$ for the pixel is coupled to the control electrode (gate) of the transistor T1. A reset line $R_n$ for the pixel is coupled to the control electrode (gate) of the transistor T2. The current path of the transistor T2 selectively couples together the first and second plates of the storage capacitor $C_s$. Color filter materials (not shown) are integrated into the pixel structure to selectively pass a desired color band of light (e.g., red light for red pixels, blue light for blue pixels, and green light for green pixels). The voltage potential stored on the storage capacitor $C_s$ provides a voltage difference between the bottom and top pixel electrodes, which controls the orientation of the LC material therebetween. Such control over the orientation of the LC material of the cell provides control over the polarization state of the light emitted therefrom and is used as part of a light valve to control the gray level light intensity for the pixel. The active pixel elements and the bottom electrodes of the pixels are integrated on a transparent glass substrate. The top electrodes of the pixels are integrated on an opposing transparent glass substrate. Liquid crystal material is disposed between these two substrates to realize the transmissive liquid crystal cells of the array 16.

During a reset operation, the gate driver 22 activates the reset line $R_n$, which causes the current path of transistor T2 to be activated. The gate driver 22 also drives the gate line for the current row ($G_n$) at an "off" level (e.g., $G_n <= '0'$). This clears any charge stored on the storage capacitor $C_s$ through the activated current path of transistor T2 and thus applies a null voltage signal to the liquid crystal cell, thereby producing a "dark" pixel. After the reset operation is complete, the gate driver 22 de-activates the reset line $R_n$, which causes the current path of transistor T2 to be de-activated.

During load and hold operations, the gate driver 22 activates the gate line $G_n$, which causes the current path of transistor T1 to be activated. The column driver 20 presents the desired voltage potential signal onto the source line $S_m$, where it is loaded onto the storage capacitor $C_s$ by the activated current path of transistor T1. The gate driver 22 then de-activates the gate line $G_n$, which causes the current path of transistor T1 to be de-activated and thus isolates the storage capacitor $C_s$ and the liquid crystal cell from the source line $S_m$. During this time period (which is referred to as the hold period), the charge stored by storage capacitor $C_s$ maintains the application of the desired voltage potential signal on the liquid crystal cell. This holding condition continues for the duration of the active frame. The reset line $R_n$ remains inactive for all of these operations.

Figure 4B:
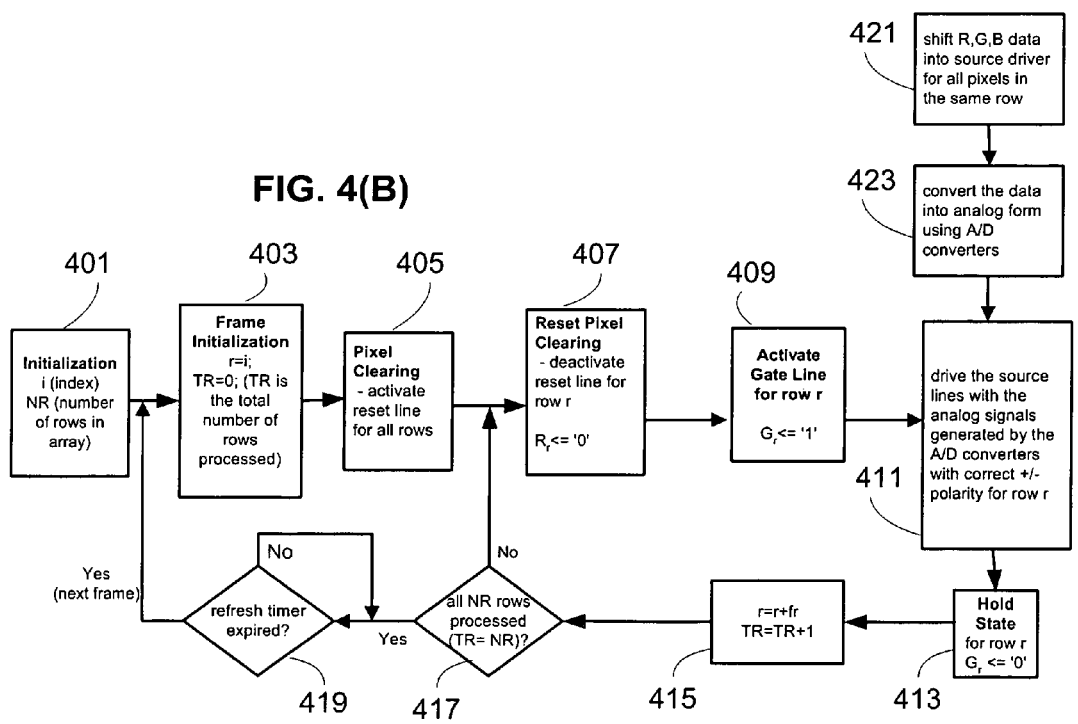
FIG. 4(B) is a flow chart illustrating the pixel clearing operations and load and hold operations that are carried out by the column driver and gate driver of the display apparatus of FIG. 2 in accordance with a second embodiment of the present invention.

These pixel clearing operations and load and hold operations are performed for each row of the pixel array 16 as depicted in the flow chart of FIG. 4(B). The operations begin in block 401 by initializing an index i (which refers to the starting row number in each frame) and a variable NR (which refers to the total number of rows in the array and in each frame). In block 403, a counter r (which refers to the current row) is set to the index i, and a counter TR (which refers to the total number of rows processed in the loop of blocks 305-315) is initialized to '0'. In block 405, the gate driver 22 simultaneously activates all of the reset line $R_0$, $R_1$, ... $R_y$ of the array 16 ($R_0 <='1'$, $R_1 <='1'$, ... $R_y <='1'$). The gate lines $G_0$, $G_1$, ... $G_y$ of the array 16 are driven at an "off" level ($G_0 <='0'$, $G_1 <='0'$, ... ). This clears any charge stored on the storage capacitors of all the pixels of the array 16 through the activated current paths of the T2 transistors of the pixels and thus applies a null voltage signal to the liquid crystal cells of the pixels, thereby producing "dark" pixels over the array.

In blocks 407-417, row-based loading and holding operations are performed over the rows of the array 16 for the current frame. In block 407, the gate driver 22 de-activates the reset line $R_r$ for the current row r ($R_r <='0'$), which causes the current paths of the T2 transistors for the pixels of row r to be de-activated. In block 409, the gate driver 22 activates the gate line $G_r$ for the row r ($G_r <='1'$). In block 411, the column driver 20 drives the source lines $S_0, S_1, \ldots S_x$ of the array 16 with the analog voltage levels and polarities in accordance with the red, green and blue pixel data corresponding for the pixels of the row. Such data is shifted into the column driver 20 in block 421 and converted from digital to analog form in block 423. As a result of blocks 409 and 411, for each given pixel in the row r, the current path of the T1 transistor is activated for the given pixel and the desired voltage potential signal is loaded into the storage capacitor $C_s$ of the given pixel by the activated current path of the T1 transistor. In block 413, the gate driver 22 de-activates the gate line $G_r$ for the row r ($G_r <='0'$), which causes the current path of the T1 transistor to be de-activated for each pixel in row r and thus isolates the storage capacitors and the liquid crystal cells of the pixels in row r from their corresponding source lines. In this condition, the charge stored by the respective storage capacitors maintains the application of the desired voltage potential signal on the corresponding liquid crystal cell. This holding condition continues for the duration of the active frame. In block 415, the current row counter r is updated by a function fr and the counter TR is incremented by 1. In the preferred embodiment, the initialization of the row counter r and the function fr are adapted to provide smooth and balanced illumination distributed over the rows of the panel 16. In block 417, it is determined if all of the rows of the array 16 have been processed (i.e., TR=NR). If not, the operation returns to blocks 407-415 to load and hold the next row of pixels. If so, the operations continue to block 419 to wait for a refresh timer to expire. Such expiration marks the end of the display period for the current frame. Upon expiration of the refresh timer, the operations return to blocks 403-417 to perform the pixel clearing operations and row-based load and hold operations for the pixels of the next frame. The load and hold operations for the pixels of each frame alternate between operations that display a left perspective image in a left perspective image display period and operations that display a right perspective image in a right perspective image display period (FIG. 4(D)(i)). During the left perspective image display period, the analog voltage potential signals loaded into the pixels of the array are derived from the red, green and blue pixel data of the corresponding left perspective image data that is received by the column driver 20. During the right perspective image display period, the analog voltage potential signals loaded into the pixels of the array are derived from the red, green and blue pixel data of the corresponding right perspective image data that is received by the column driver 20.

Figure 4C:
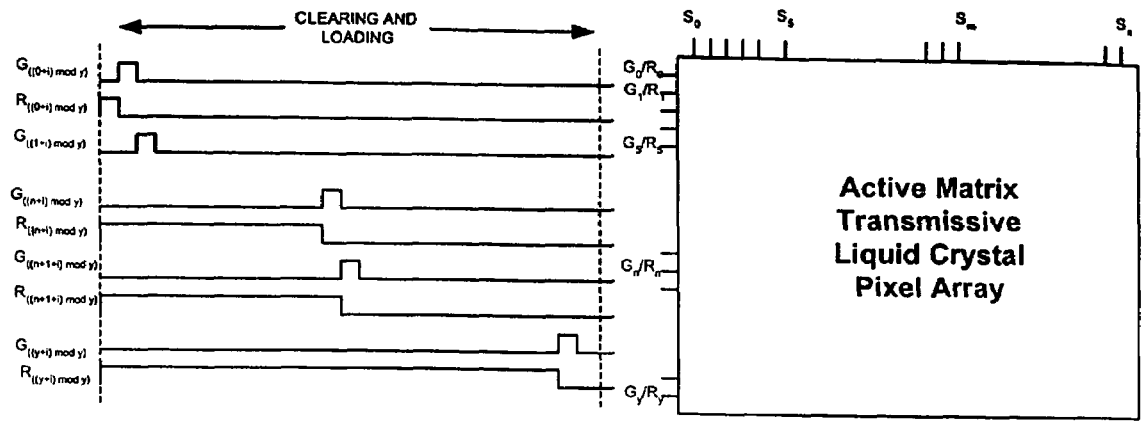
FIG. 4(C) is a schematic diagram that illustrates the operation of the gate driver of FIG. 2 in activating and de-activating the gate lines and reset lines of the pixel array as part of the pixel clearing operations and the load and hold operations of FIG. 4(B).
Figure 4C:
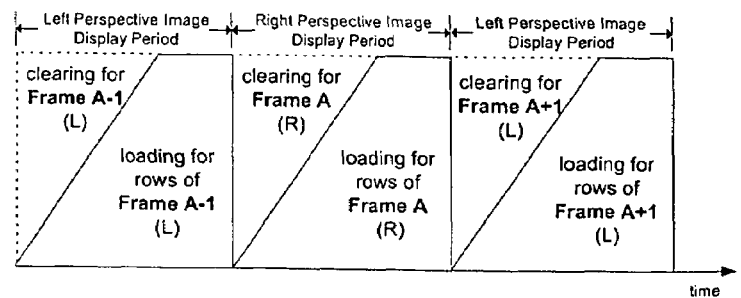

FIG. 4(C) illustrates the operation of the gate driver 22 in activating and deactivating the gate lines and reset lines of the array 16 as part of the pixel clearing and load and hold operations of FIG. 4(B).

Figure 4D:
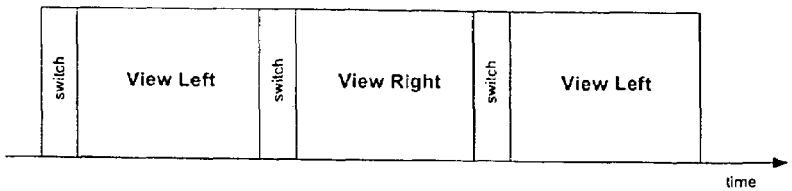
FIGS. 4(D)(i) and (ii) are schematic diagrams that illustrate the temporal relationship of the pixel clearing operations and load and hold operations of FIG. 4(B) with the operation of shutter glasses, respectively.

FIGS. 4(D)(i) and (ii) illustrate the temporal relationship of the pixel clearing and load and hold operations of FIG. 4(B) with the operation of shutter glasses, respectively. Such operations provide for improved stereoscopic viewing. As shown in FIG. 4(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the beginning of the pixel clearing and load and hold operations of the display as shown, is synchronized to the corresponding left and right perspective image display periods of the display by a synchronization signal communicated from the interface block 18 to the shutter glasses (FIG. 2). The synchronization signal may be communicated from the interface block 18 to the shutter glasses over a wired or wireless communication link therebetween.

FIGS. 5(A), 5(B), 5(C), 5(D)(i) and 5D(ii) illustrate a third embodiment of the present invention whereby the active pixel structure, the column driver 20 and the gate driver 22 of the display 14 are adapted to perform interleaved pixel loading and display operations. In the architecture of FIG. 2(A), the interleaved pixel loading and display operations are performed over sequential color components that make-up the left perspective images and the right perspective images encoded by the frame sequential digital video signal communicated from the video processor 12 to the interface block 18. For example, consider a system where the display sub-period that the green color component of the left or right perspective image is projected from the reflective pixel array immediately precedes the display sub-period for the blue color component. In this exemplary system, the pixel loading of the blue color component for the left or right perspective image is interleaved with the display operations of the green color component. In the architecture of FIG. 2(B), the interleaved pixel loading and display operations are performed over the left perspective images and the right perspective images encoded by the frame sequential digital video signal. In the architecture of FIG. 2(B), during right perspective image display periods, the pixels of the array are loaded with analog voltage potential signals corresponding to a left perspective image while displaying the preceding right perspective image. Likewise, during left perspective image display periods, the pixels of the array are loaded with analog voltage potential signals corresponding to a right perspective image while displaying the preceding left perspective image.

In both architectures, cross-frame image interference (FIG. 1) is avoided. Moreover, such interleaved operations avoids time lag between the active display of the component images in the architecture of FIG. 2(A) and the time lag between the active display of left and right perspective images in the architecture of FIG. 2(B), and thus provides for expansion of the left and right perspective image display periods and improved stereoscopic viewing quality.

Figures 5A, 5B:
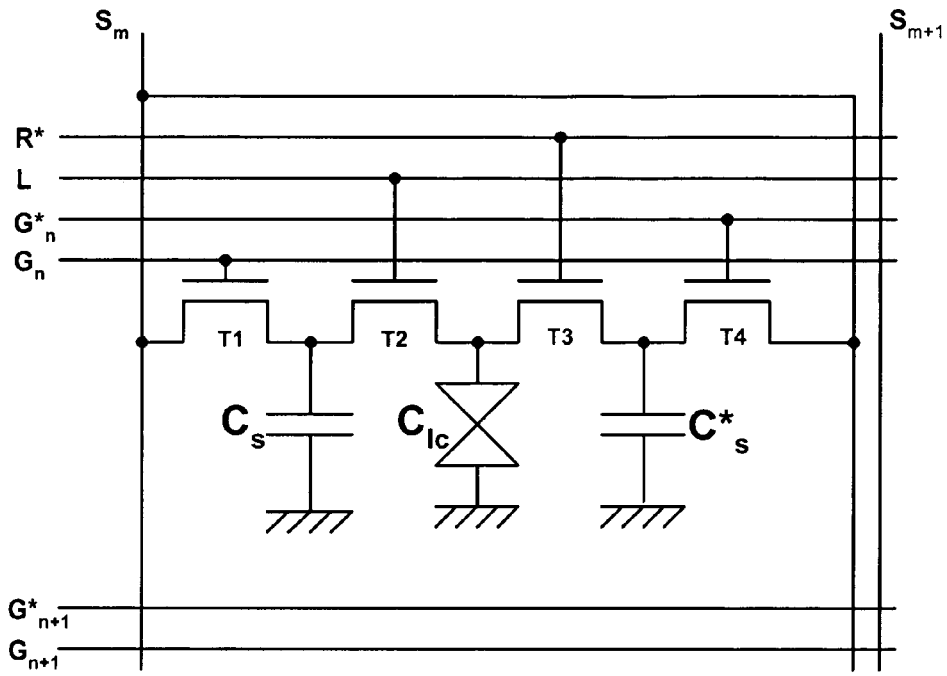
FIG. 5(A) is a schematic diagram of yet another active pixel structure for the pixels of the array of FIG. 2.
FIG. 5(B) is a table illustrating the interleaved loading and display operations that are carried out by the column driver and gate driver of the display apparatus of FIG. 2 in accordance with a third embodiment of the present invention.

FIG. 5(A) illustrates another active pixel structure in accordance with the present invention. In this structure, the pixel has two storage capacitors $C_s$ and $C^*_s$, a source line $S_m$ (which is coupled to the pixels of the column m of the array), and two gate lines $G_n$ and $G^*_n$ (which are coupled to the pixels of the row n of the array). Two control lines R* and L are coupled to all of the pixels of the array. The source line $S_m$ is selectively coupled to the first plate of storage capacitor $C_s$ by the current path of a thin-film transistor T1. The source line $S_m$ is also selectively coupled to the first plate of storage capacitor $C^*_s$ by the current path of a thin-film transistor T4. The first plate of the storage capacitor $C_s$ is selectively coupled to the transparent bottom electrode of the liquid crystal cell (denoted by its parasitic capacitance $C_{lc}$) by the current path of a thin-film transistor T2. The first plate of the storage capacitor $C^*_s$ is selectively coupled to the transparent bottom electrode of the liquid crystal cell (denoted by its parasitic capacitance $C_{lc}$) by the current path of a thin-film transistor T3. The transparent top electrode of the liquid crystal cell is coupled to a reference voltage (e.g., ground potential as shown). The second plate of the storage capacitor $C^*_s$ and the second plate for the storage capacitor $C^*_s$ are also coupled to the reference voltage (e.g., ground potential as shown). The gate line $G_n$ is coupled to the control electrode (gate) of the transistor T1. The gate line $G^*_n$ is coupled to the control electrode (gate) of the transistor T4. The control line L is coupled to the control electrode (gate) of the transistor T2. The control line R* is coupled to the control electrode (gate) of the transistor T3. Color filter materials (not shown) are integrated into the pixel structure to selectively pass a desired color band of light (e.g., red light for red pixels, blue light for blue pixels, and green light for green pixels). The voltage potential stored on the storage capacitor $C_s$ provides a voltage difference between the bottom and top pixel electrodes, which controls the orientation of the LC material therebetween. Such control over the orientation of the LC material of the cell provides control over the polarization state of the light emitted therefrom and is used as part of a light valve to control the gray level light intensity for the pixel. The active pixel elements and the bottom electrodes of the pixels are integrated on a transparent glass substrate. The top electrodes of the pixels are integrated on an opposing transparent glass substrate. Liquid crystal material is disposed between these two substrates to realize the transmissive liquid crystal cells of the array 16.

As shown in the table of FIG. 5(B), during right perspective image display periods, the gate driver 22 de-activates the control line L (L <='0'), which causes the current path of transistor T2 to be inactive for all pixels of the array 16. The inactive current path of transistor T2 isolates the first plate of the storage capacitor $C_s$ from the liquid crystal cell for all pixels of the array. For a given row n of the array 16, the gate driver 22 activates the gate line $G_n$ ($G_n$ <='1') for the row n, which causes the current path of transistor T1 to be active for the pixels of row n. The active current path of the transistor T1 couples the source line $S_m$ to the first plate of the storage capacitor $C_s$ for the pixels in row n. The column driver 20 presents the desired voltage potential signal onto the source lines of the array, where it is loaded onto the storage capacitor $C_s$ by the activated current path of transistor T1 for the pixels in row n. The gate driver 22 then de-activates the gate line $G_n$, ($G_n$ <='1'), which causes the current path of transistor T1 to be de-activated and thus isolates the storage capacitor $C_s$ from the source line $S_m$ for the pixels in row n. In this state, which is referred to as the holding condition or hold state, the storage capacitor $C_s$ stores charge that maintains the application of the desired voltage potential signal on the liquid crystal cell in the subsequent left perspective image display period. This holding condition continues for the duration of the active right image display period. These pixel loading and holding operations are repeated for each row of the array 16.

Concurrently during the right perspective image display periods, the gate driver 22 de-activates the gate lines $G^*_n$ ($G^*_n <= `0'$) over all of the rows of the array 16 and activates the control line $R^*$ ($R^* <= `1'$). The de-activation of the gate lines $G^*_n$ over all of the rows causes the respective current path of transistor T4 to be inactive for all of the pixels of the array, thereby isolating the first plate of the storage capacitor $C^*_s$ from the source line $S_m$ for all of the pixels of the array. The activation of the control line $R^*$ causes the respective current path of transistor T3 to be active for all of the pixels of the array. The active current path of transistor T3 couples the storage capacitor $C^*_s$ to the liquid crystal cell for all of the pixels of the array such that the voltage loaded onto the respective storage capacitors $C^*_s$ in the previous left perspective image display period is applied to the corresponding liquid crystal cell for display. During left perspective image display periods, the gate driver 22 de-activates the control line $R^*$ ($R^* <= `0'$), which causes the current path of transistor T3 to be inactive for all pixels of the array 16. The inactive current path of transistor T3 isolates the first plate of the storage capacitor $C^*_s$ from the liquid crystal cell for all pixels of the array. For a given row n of the array 16, the gate driver 22 activates the gate line $G^*_n$ ($G^*_n <= `1'$) for the row n, which causes the current path of transistor T4 to be active for all pixels of the row n. The active current path of the transistor T4 couples the source line $S_m$ to the first plate of the storage capacitor $C^*_s$. The column driver 20 presents the desired voltage potential signal onto the source lines of the array, where it is loaded onto the storage capacitor $C^*_s$ by the activated current path of transistor T4 for the pixels in row n. The gate driver 22 then de-activates the gate line $G^*_n$ ($G^*_n <= `1'$), which causes the current path of transistor T4 to be de-activated and thus isolates the storage capacitor $C^*_s$ from the source line $S_m$ for the pixels in row n. In this state, which is referred to as the holding condition or hold state, the storage capacitor $C^*_s$ stores charge that maintains the application of the desired voltage potential signal on the liquid crystal cell in the subsequent right perspective image display period. This holding condition continues for the duration of the active left perspective image display period. These pixel loading and holding operations are repeated for each row of the array 16.

Concurrently during the left perspective image display periods, the gate driver 22 de-activates the gate lines $G_n$ ($G_n <= `0'$) over all of the rows of the array 16 and activates the control line L ($L <= `1'$). The de-activation of the gate lines $G_n$ over all of the rows causes the respective current path of transistor T1 to be inactive for all of the pixels of the array, thereby isolating the first plate of the storage capacitor $C_s$ from the source line $S_m$ for all of the pixels of the array. The activation of the control line L causes the respective current path of transistor T2 to be active for all of the pixels of the array. The active current path of transistor T2 couples the storage capacitor $C_s$ to the liquid crystal cell for all of the pixels of the array such that the voltage loaded onto the respective storage capacitors $C_s$ in the previous right perspective image display period is applied to the corresponding liquid crystal cell for display.

Figure 5C:
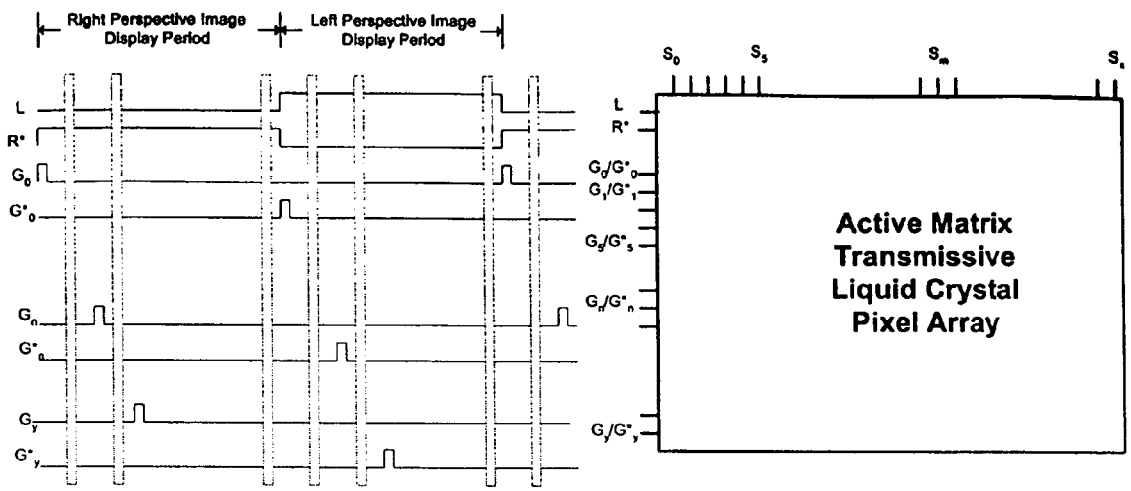
FIG. 5(C) is a schematic diagram that illustrates the operation of the gate driver of FIG. 2 in activating and de-activating the gate lines and control lines of the pixel array as part of the interleaved loading and display operations of FIG. 5(B).

FIG. 5(C) illustrates the operation of the gate driver 22 in activating and deactivating the gate lines and control lines of a corresponding array as part of the interleaved pixel load/hold operations and display operations as described above with respect to FIG. 5(B).

Figure 5D:
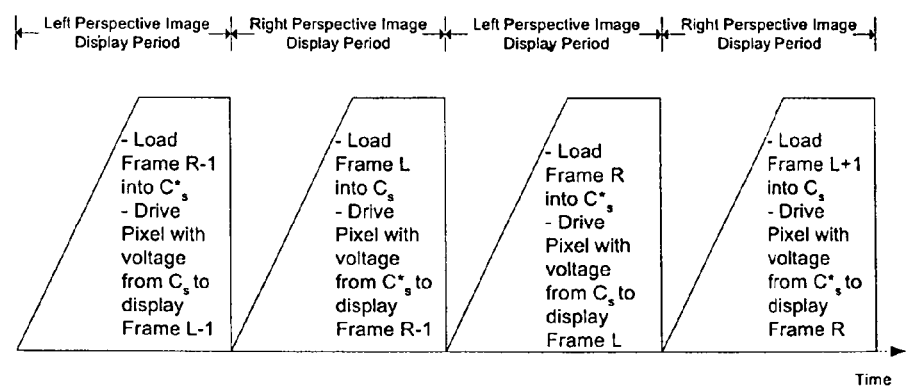
FIGS. 5(D)(i) and (ii) are schematic diagrams that illustrate the temporal relationship of the interleaved loading and display operations of FIG. 5(B) with the operation of shutter glasses, respectively.
Figure 5D:
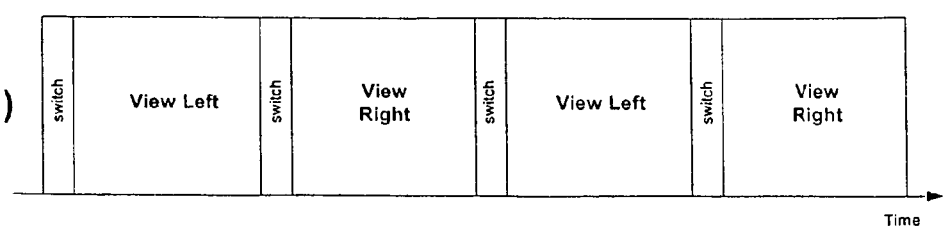

FIGS. 5(D)(i) and (ii) illustrate the temporal relationship of the interleaved pixel load/hold operations and display operations of FIG. 5(B) with the operation of shutter glasses, respectively. Such operations provide for improved stereoscopic viewing. As shown in FIG. 5(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the beginning of the respective left and right perspective image display periods as shown, is synchronized to the corresponding left and right perspective image display periods of the display by a synchronization signal communicated from the interface block 18 to the shutter glasses (FIG. 2). The synchronization signal may be communicated from the interface block 18 to the shutter glasses over a wired or wireless communication link therebetween.

There have been described and illustrated herein several embodiments of a stereoscopic transmissive active-matrix liquid crystal flat panel display system and methodologies and mechanisms used therein. While particular embodiments of the invention have been described, it is not intended that the invention be limited thereto, as it is intended that the invention be as broad in scope as the art will allow and that the specification be read likewise. Thus, while particular system architectures and particular pixel structures have been disclosed, it will be appreciated that other system architectures and pixel structures can be used as well. In addition, while particular signaling schemes and control schemes have been disclosed, it will be understood that other signaling schemes and control schemes can be used. For example, the front end video processing block and the interface block described above generate and process a frame sequential stereo video signal. Such processing is advantageous because it can operate on traditional (non-stereo) frame sequential video signals to provide for display of such traditional frame sequential video signals (without the use of shutter glasses). One skilled in the art will appreciate that the processing block and interface block can readily be adapted to accommodate other signal formats, including, but not limited to, a dual-channel signal format (i.e., the left and right perspective images communicated in physically separate channels), a single-channel row interleaved signal format (i.e., the left and right perspective images are multiplexed together on alternating rows in each image frame), a single-channel over-under signal format (i.e., the left and right perspective images are added to the top and bottom halves of each image frame), a single-channel side-by-side signal format (i.e., the left and right perspective images are added to the left and rights sides of each image frame), a single-channel column interleaved signal format (i.e., the left and right perspective images are multiplexed together on alternating columns of each image frame), and single-channel dual-frame color multiplexed format (i.e., the left and right perspective images are encoded in two sequential output frames by color multiplexing). It will therefore be appreciated by those skilled in the art that yet other modifications could be made to the provided invention without deviating from its spirit and scope as claimed.

What is claimed is:

1. A display apparatus comprising:
   means for receiving at least one video signal representing a sequence of image pairs including a left perspective image and a right perspective image;
   an array of transmissive-type pixels each comprising first and second storage capacitors operably coupled to a transmissive liquid crystal cell;
   means for deriving a first set of analog voltage signals for the pixels of said array in accordance with corresponding portions of said at least one video signal representing a left perspective image;
   first means, operating during a right perspective image display period, for loading the first set of analog voltage signals into the first storage capacitors of the corresponding pixels of the array concurrently with driving the liquid crystal cells of the pixels of the array with analog voltage signals stored by the second storage capacitors of the pixels of the array;
   means for deriving a second set of analog voltage signals for the pixels of said array in accordance with corresponding portions of said at least one video signal representing a right perspective image; and
   second means, operating during a left perspective image display period, for loading the second set of analog voltage signals into the second storage capacitors of the corresponding pixels of the array concurrently with driving the liquid crystal cells of the pixels of the array with analog voltage signals stored by the first storage capacitors of the pixels of the array.

2. A display apparatus according to claim 1, wherein:
   the array comprises a plurality of gate line pairs each corresponding to a unique row of pixels, a plurality of source lines each corresponding to a unique column of pixels, and first and second control lines shared by all of the pixels, each pixel further comprising first, second, third and fourth transistors, the first transistor having a control electrode and one gate line of a corresponding gate line pair electrically coupled thereto for selective activation of a conduction path from a corresponding source line to the first storage capacitor, the second transistor having a control electrode and the first control line electrically coupled thereto for selective activation of a conduction path from the first storage capacitor to the transmissive liquid crystal cell, the third transistor having a control electrode and the second control line electrically coupled thereto for selective activation of a conduction path from the second storage capacitor to the transmissive liquid crystal cell, and the fourth transistor having a control electrode and the other gate line of the corresponding gate line pair electrically coupled thereto for selective activation of a conduction path from the corresponding source line to the first storage capacitor;
   the first means comprises column driver circuitry that is adapted to supply voltage potential signals to the source lines of said array and gate driver circuitry that is adapted to i) activate the one gate line of the corresponding gate line pair to load the voltage potential signals from the source lines into the first storage capacitors of the pixels of the array, and ii) activate the second control line to drive the transmissive liquid crystal cells of the pixels of the array with the voltage potential signals stored on the second storage capacitors of the pixels of the array; and
   the second means comprises column driver circuitry that is adapted to supply voltage potential signals to the source lines of said array and gate driver circuitry that is adapted to i) activate the other gate line of the corresponding gate line pair to load the voltage potential signals from the source lines into the second storage capacitors of the pixels of the array, and ii) activate the first control line to drive the transmissive liquid crystal cells of the pixels of the array with the voltage potential signals stored on the first storage capacitors of the pixels of the array.

3. A display apparatus according to claim 1, further comprising:
   means for communicating a synchronization signal to shutter glasses.

4. A display apparatus according to claim 3, further comprising:
   shutter glasses that operate in a left view mode and a right view mode, and that include means for receiving the synchronization signal and using the synchronization signal to synchronize the left and right view modes with the left and right perspective image display periods, respectively.

5. A display apparatus according to claim 1, further comprising:
   means for generating the at least one video signal.

6. A display apparatus according to claim 1, wherein:
   said at least one video signal comprises a frame sequential stereo video signal.

7. A display method comprising:
   receiving at least one video signal representing a sequence of image pairs including a left perspective image and a right perspective image;
   providing an array of transmissive-type pixels each comprising first and second storage capacitors operably coupled to a transmissive liquid crystal cell;
   deriving a first set of analog voltage signals for the pixels of said array in accordance with corresponding portions of said at least one video signal representing a left perspective image;
   during a right perspective image display period, loading the first set of analog voltage signals into the first storage capacitors of the corresponding pixels of the array concurrently with driving the liquid crystal cells of the pixels of the array with analog voltage signals stored by the second storage capacitors of the pixels of the array;
   deriving a second set of analog voltage signals for the pixels of said array in accordance with corresponding portions of said at least one video signal representing a right perspective image; and
   during a left perspective image display period, loading the second set of analog voltage signals into the second storage capacitors of the corresponding pixels of the array concurrently with driving the liquid crystal cells of the pixels of the array with analog voltage signals stored by the first storage capacitors of the pixels of the array.

8. A display method according to claim 7, wherein:
   the array comprises a plurality of gate line pairs each corresponding to a unique row of pixels, a plurality of source lines each corresponding to a unique column of pixels, and first and second control lines shared by all of the pixels, each pixel further comprising first, second, third and fourth transistors, the first transistor having a control electrode and one gate line of a corresponding gate line pair electrically coupled thereto for selective activation of a conduction path from a corresponding source line to the first storage capacitor, the second transistor having a control electrode and the first control line electrically coupled thereto for selective activation of a conduction path from the first storage capacitor to the transmissive liquid crystal cell, the third transistor having a control electrode and the second control line electrically coupled thereto for selective activation of a conduction path from the second storage capacitor to the transmissive liquid crystal cell, and the fourth transistor having a control electrode and the other gate line of the corresponding gate line pair electrically coupled thereto for selective activation of a conduction path from the corresponding source line to the first storage capacitor;

during the right perspective image display period, voltage potential signals are supplied to the source lines of said array, the one gate line of the corresponding gate line pair is activated to load the voltage potential signals from the source lines into the first storage capacitors of the pixels of the array, and the second control line is activated to drive the transmissive liquid crystal cells of the pixels of the array with the voltage potential signals stored on the second storage capacitors of the pixels of the array; and during the left perspective image display period, voltage potential signals are supplied to the source lines of said array, the other gate line of the corresponding gate line pair is activated to load the voltage potential signals from the source lines into the second storage capacitors of the pixels of the array, and the first control line is activated to drive the transmissive liquid crystal cells of the pixels of the array with the voltage potential signals stored on the first storage capacitors of the pixels of the array.

9. A display method according to claim 7, further comprising:
   communicating a synchronization signal to shutter glasses.

10. A display method according to claim 9, further comprising:
    receiving the synchronization signal at the shutter glasses and using the synchronization signal to synchronize left and right view modes with the left and right perspective image display periods, respectively.

11. A display method according to claim 7, further comprising:
    generating the at least one video signal.

12. A display method according to claim 7, wherein:
    said at least one video signal comprises a frame sequential stereo video signal.

* * * * *